(12) United States Patent
Mirtar et al.

(10) Patent No.: US 11,455,580 B2
(45) Date of Patent: Sep. 27, 2022

(54) TRANSIT-ROUTING EXPEDITER SYSTEMS AND METHODS FOR MULTI-MODAL JOURNEY OPTIMIZATION

(71) Applicant: Ford Global Technologies, LLC, Dearborn, MI (US)

(72) Inventors: Ali Mirtar, San Diego, CA (US); Mohammad Abouali, Canton, MI (US); Shengjie Tu, Ann Arbor, MI (US); Adam David DeJans, Jr., Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 378 days.

(21) Appl. No.: 16/671,013

(22) Filed: Oct. 31, 2019

(65) Prior Publication Data

US 2021/0133643 A1 May 6, 2021

(51) Int. Cl.
*G06Q 10/04* (2012.01)
*G06Q 50/30* (2012.01)
*H04W 4/024* (2018.01)
*G01C 21/34* (2006.01)

(52) U.S. Cl.
CPC ....... *G06Q 10/047* (2013.01); *G01C 21/3423* (2013.01); *G01C 21/3446* (2013.01); *G06Q 50/30* (2013.01); *H04W 4/024* (2018.02)

(58) Field of Classification Search
CPC ............ G01C 21/3423; G01C 21/3446; G06Q 10/047; G06Q 50/30; G06Q 10/08355; G06Q 50/26; H04W 4/024
See application file for complete search history.

(56) References Cited

U.S. PATENT DOCUMENTS

| | | | |
|---|---|---|---|
| 9,116,007 B2 | 8/2015 | Griffiths | |
| 9,404,760 B2 * | 8/2016 | Ulloa Paredes | ... G01C 21/3423 |
| 2009/0254405 A1 | 10/2009 | Hollis | |
| 2010/0280748 A1 | 11/2010 | Mundinger et al. | |
| 2020/0273333 A1 * | 8/2020 | Elshenawy | ........ G01C 21/3423 |

OTHER PUBLICATIONS

M. Muller-Hannemann et al. "Timetable Information: Models and Algorithms" (Jan. 2004) p. 1-22.

* cited by examiner

*Primary Examiner* — Geepy Pe
*Assistant Examiner* — Paulo Roberto Gonzalez Leite
(74) *Attorney, Agent, or Firm* — Brandon Hicks; Eversheds Sutherland (US) LLP (57) ABSTRACT

Transit-routing expediter systems and methods for multi-modal journey optimization are disclosed herein. An example method includes determining journey parameters having an origin location, a destination location, and a time of departure; determining paths based on the journey parameters, each of the paths including any combination of route-based options, non-route-based options, or walking options; determining arrival times of the paths relative to the destination location; and identifying a set of solutions for the paths based on the arrival times using an iterative analysis.

5 Claims, 4 Drawing Sheets

TRANSIT-ROUTING EXPEDITER SYSTEMS AND METHODS FOR MULTI-MODAL JOURNEY OPTIMIZATION

TECHNICAL FIELD

The present disclosure relates to transit routing and logistics that can include systems and methods that determine routes for a journey that can utilize various transit options.

BACKGROUND

An increase in various modes of transportation has been realized in the recent past. These modes of transportation include, but are not limited to, vehicle sharing, bike sharing, buses, and subways—just to name a few. The modes of transportation available to commuters include both public transit and point-to-point options. Public transit can be provided through different Public Transit Operators (PTO). A PTO shares service schedules with commuters. For example, bus authority can provide commuters with daily bus schedules and rates. Point-to-point options lack specific schedules but provide access information to commuters such as pickup locations, rates, and so forth.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods disclosed herein are configured to provide transit-routing expediter systems and methods. These transit-routing expediter systems and methods can provide multi-modal journey analysis that allows a commuter to identify a number of multi-modal journey paths based on available transit options. The systems and methods disclosed herein may allow a commuter to perform a multi-modal journey analysis beginning at an arbitrary origin location and time, and ending at a destination location. Generally, the multi-modal journey analysis locates a set of N fastest ways to arrive at the destination location, considering a variety of transit options. Generally, the transit options available for the multi-modal journey include a schedule or route-based public transportation such as buses, trains, and the like. The transit options can also include non-route-based transit options such as ride-sharing, rentable scooters or bicycles, and so forth. In contrast with route-based public transit options, non-route-based public transit options have no fixed route or schedule. The systems and methods disclosed herein can also include walking as a transit option for a commuter. In sum, the system and methods herein utilize as input an origin location where the commuter departs, and a destination location where the commuter will arrive, and a time of departure from the origin location. Given these three data, a search can be performed across a plurality of paths/routes and transit options to find the N fastest arrival times.

Illustrative Embodiments

Figure 1:
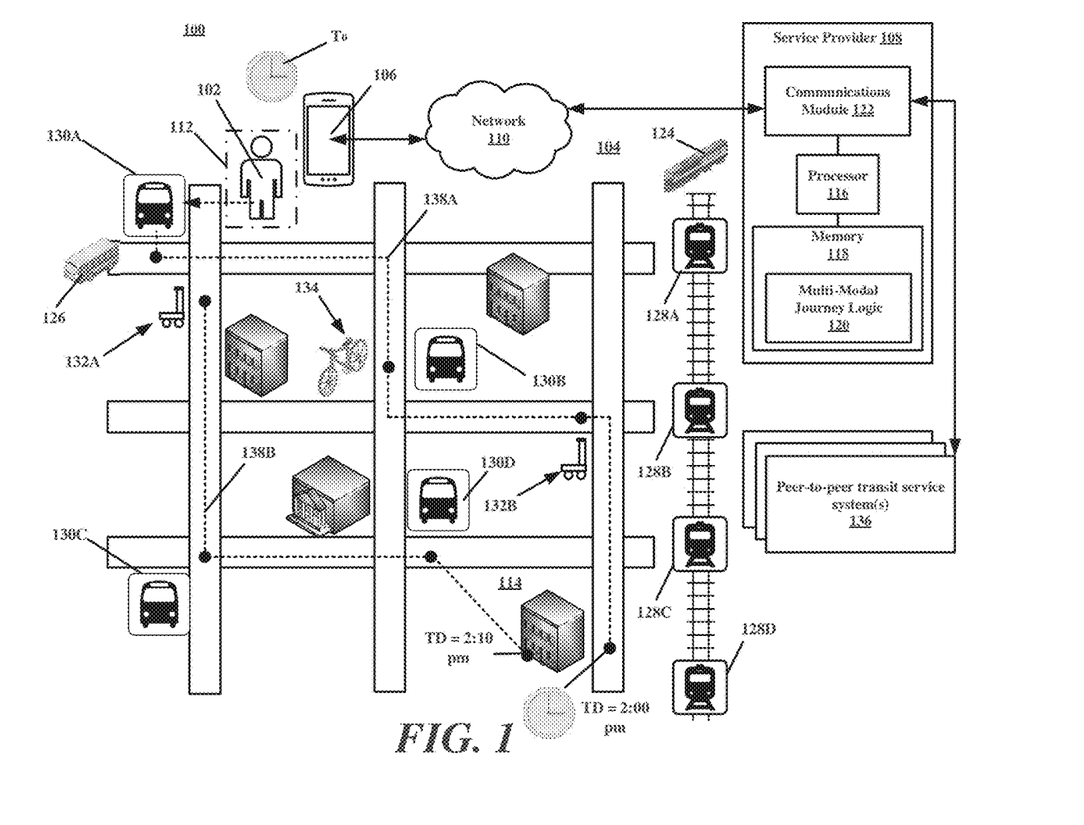
FIG. 1 depicts an illustrative architecture in which techniques and structures for providing the systems and methods disclosed herein may be implemented.

Turning now to the drawings, FIG. 1 depicts an illustrative architecture 100 in which techniques and structures of the present disclosure may be implemented. The illustrative architecture 100 may include a commuter 102 within a city 104. The commuter 102 can utilize a mobile device 106 to obtain multi-modal journey data from a service provider 108 over a network 110. The network 110 may include any one or a combination of multiple different types of networks, such as cable networks, the Internet, wireless networks, and other private and/or public networks. In some instances, the network 110 may include cellular, Wi-Fi, or Wi-Fi direct.

For context, a commuter desires to travel from an origin location 112 to a destination location 114. The commuter may embark from the origin location 112 at a time of departure $T_O$. The parameters of the origin location 112 can be determined from location or position data obtained by the service provider 108 from the mobile device 106.

In traversing from the origin location 112 to the destination location 114, the commuter 102 may have at their disposal many types of transit options. Generally, the transit options include walking options where the commuter 102 can walk to various stops. The transit options may also include route-based transit options where the commuter 102 uses public transit options such as buses, trains, or other transit options that follow a defined route and schedule. The commuter 102 may also utilize non-route-based transit options such as ride-sharing, cabs, scooters, and bicycles—just to name a few. In traversing from the origin location 112 to the destination location 114, various combinations of these transit types are possible. The service provider 108 can be configured to determine a set of solutions to an optimization problem, namely determining which combinations of the transit options ensure that the commuter 102 reaches the destination location 114 in an expeditious manner.

Stated otherwise service provider can be configured to optimize a multi-modal journey planning problem for the commuter 102. It provides the best N solutions, where N refers to a number of solutions desired. As its input, the service provider 108 utilizes the origin location 112 where the commuter departs from and the destination location 114 where the commuter 102 desires to arrive and the time of departure $T_O$ from the origin location 112. Given these data, the service provider 108 performs a search on existing routes and transit agencies (e.g., collectively referred to as stops) and finds the N fastest arrival time at the destination location 114.

The service provider 108 can comprise a processor 116 and a memory 118 for storing executable instructions. The processor 116 can execute instructions stored in memory, such as multi-modal journey logic 120 to perform the multi-modal journey planning processes disclosed herein. The service provider 108 can include a communications module 122 that communicatively couples the service provider 108 to the network 110.

Route-based transit options can include, but are not limited to a train 124 or a bus 126 operate within the city 104. These types of public transportation traverse routes over the city and make specific stops. For example, the train 124 makes stops 128A-128D along a given route, while the bus 126 makes stops 130A-130C along a given route. Each of these route-based transit options may pick up and drop off commuters at their respective stops according to a schedule.

In addition to route-based transit options, various non-route-based transit options may operate within the city 104. Examples of non-route-based transit options include, but are not limited to scooter rentals, bicycle rentals, and the like. While these options are non-route-based because they are controlled by commuters and do not follow routes. It will be understood that a location where a non-route-based transit option is available is also referred to as a stop. Non-route-based transit options such as scooter pickup stops 132A and 132B may be located throughout the city 104. Other non-route-based transit options, such as bicycle pick pickup stop 134 may also be present. The location of each of these non-route-based transit options may be accessible to the service provider 108 through data provided by various point-to-point transit service system(s) 136. Locations of stops for some non-route-based transit options can be dynamic. For example, a pickup location for a scooter could vary based on where prior commuters have left the scooter. Other types of non-route-based transit options may have static pickup locations. The point-to-point transit service systems 136 can provide the service provider 108 with current locations of the non-route-based transit options. To be sure, with respect to the calculation of non-route-based transit options, walking may be excluded as an option in some embodiments. That is, while walking options may be considered when evaluating marked stops, the service provider 108 may not consider a walking option in the multi-modal journey planning subsequent to an initial marked stop.

Prior to discussing specific aspects of multi-modal journey planning, some data structures utilized by the service provider 108 will be discussed. The service provider 108 can be configured to utilize a custom data structure referred to as a fixed length priority queue (FLPQ). In general, a FLPQ is a priority queue with restricted capacity. The capacity of FLPQ may be determined at the time of instance creation. FLPQ is a queue that holds different objects based on their natural order. When a new element is added to the FLPQ that has a higher natural order, it is moved to a bottom of the FLPQ and elements with a smaller natural order are moved closer to a queue head of the FLPQ. When the slots of the FLPQ have filled, the service provider 108 can add a new item to FLPQ in a rolling manner. If a new element has a lower order than existing elements in the FLPQ, the new element can be rejected. Otherwise, the new element can be added to the FLPQ and a lowest order item can be rejected and removed.

In summary, FLPQ can implement the following operations: adding a new element, removing a new element which removes an element in the FLPQ with a lowest natural order, determining a top of the FLPQ, and determining a bottom of the FLPQ. Logic for creating and using a FLPQ of the present disclosure includes:

```
interface FixedLengthPriorityQueue<E>{
    boolean offer (E e) ;
    E poll ( ) ;
    E peekTop ( ) ;
    E peekBottom ( ) ;
}
```

Also, the service provider 108 can utilize a parent pointing tree node to define a path of stops from the origin location 112 to the destination location 114. Each node of the tree includes at least two data such as arrival time to a stop, and a number of hops to the stop. Generally speaking, the number of hops includes a number of public transit options that the commuter 102 has used up to a specific point during a trip. For example, while the service provider 108 may calculate a total trip time, a number of hops can also be tracked. Eventually, when best options are determined, the service provider 108 can determine the time it takes to get to a specific location using each option. If there are two or more options that have the same arrival time, the service provider can evaluate the number of hops and choose the option that has the least number of hops. So hop data can be used to choose the best N routes in the end, when a plurality of routes have been found.

In another example, when the commuter 102 walks from the origin location 112 to a first bus stop 130A, the number of hops is zero because the commuter 102 has not used any public transit option. In another example, when the commuter 102 leaves a bus after staying in it for ten stops, the number of hops is one, because there is only one transport option/service used, which is independent of the number of stops that the commuter utilized in that trip.

When a node is added to the FLPQ by the service provider 108, the service provider 108 first defines a natural order of the node relative to other nodes in the FLPQ. In some embodiments, the service provider 108 initially compares nodes currently in the FLPQ based on their respective arrival times (e.g., when the commuter 102 would arrive at a given stop). The node having a stop with an earlier arrival time may be considered by the service provider 108 to be more significant and therefore has a higher natural order. If the two nodes are determined to have the same arrival time, then the node one with the least number of hops is more significant and would, therefore, have a higher natural order. A class representing a parent pointing node in a path tree can be determined using the following logic:

```
class Node {
    Int arrivalTime;
    Int numOfHops;
    Node parent;
}
```

The service provider 108 can be configured to execute the multi-modal journey logic 120 to perform multi-modal journey planning. The service provider 108 begins multi-modal journey planning by initiating an iterative process using an initial condition where a number of hops k that is equal to zero (as noted above, the number of hops is relevant in determinations where two options have the same duration (time) and the option with the fewest hops can be selected). The service provider 108 iteratively increases k until a set of N solutions is determined for the destination location. In another embodiment, the service provider 108 can evaluate all possible routes with a maximum number of hops. Maximum number of hops can be an arbitrary number that can be selected. In one example 100 hops can be selected. A logical trip in a city may never reach 100 hops, so this could be used as an extreme upper bound. If there is a route from A to B it should be much smaller than 100. In practice, when there is a solution, the maximum number of hops may not be reached and the calculation may terminate.

At each iteration the service provider 108 can assign a FLPQ to any stop S which is represented as Q(S, k) that is filled with nodes. Basically, Q(S, k) is an FLPQ of nodes with a capacity of N which represents the N best paths to stop S with a k number of hops. In one example, if So (origin location or marked stop) is selected as an origin stop and departing time Td is selected for traveling to a destination stop Sd, the service provider 108 can create a first node as a path root with node(td, 0) and add it to Q(So, 0). In general, any possible transit stop may be identified as a stop option.

Therefore Q(So, 0).peekTop( ).arrivalTime is equal to td, which refers to a best arrival time at the origin with zero hop. For context this could include a first location and is equal to a departure time. When the service provider 108 updates a new time for a stop, the service provider 108 can compare the updated time for the stop with the arrival times that were previously determined for the destination stop Sd and mark a current stop to be evaluated in the next iteration, if needed. The service provider 108 is configured to determine if a stop that is being currently evaluated should be marked for further processing in a next iteration by performing a check that returns a Boolean value that indicates whether or not to mark the stop that is being currently evaluated for further processing in a next iteration.

The service provider 108 can create a FLPQ with size N for the destination location 114 to hold all of its best arrival times naming destinationArrivalTimes. When the FPLQ is not filled, the service provider 108 can marks the stop that is being currently evaluated for further processing in a next iteration. When a new arrival time for a stop is determined to be better than a latest arrival time for the destination for another stop currently in the FLPQ, the service provider can mark the stop being evaluated for further processing. The following example code illustrates example conditional logic used to determine if a stop that is being currently evaluated should be identified or marked for further processing in a next iteration:

```
'continueMarkingStop (S, time, Sd) ?';
If ( time == infinity) {
    We do not mark a stop if its time is infinity;
    return No;
}
if (S == Sd) {
    targetArivalTimes.offer (t);
    We do not mark target stop therefore;
    return No;
}
if (destinationArrivalTimes.size ( ) <N) {
    We still have not found enough solutions.
    So we need to continue marking stops.;
    return Yes;
}
if (time < destinationArrivalTimes.peekTop ( ) {
    This is better than solutions we have found
    Let's mark this stop.;
    return Yes;
}
This is not better than solutions we have found
Let's ignore it.;
return No;
```

In sum, when a stop that is being currently evaluated has an improved arrival time to the destination location, the service provider 108 retains the stop in the FLPQ and marks it for further evaluation in a subsequent iteration. A plurality of additional stops (e.g., potential or possible stops that could be utilized by the commuter 102) can be evaluated by the service provider 108 in a similar manner.

Using the processes above, an example base determination can be executed by the service provider 108, which begins with a number of hops equal to zero. Example logic for creating a node for an origin location and a departure time with no parent nodes includes:

```
Create a node for origin with no parent and departure time:
'Q(S0, 0) .offer. (Node (td, 0, null)) ';
WalkingSet <== stops in walking distance of S0;
while ( Foreach Stop S left in walkingSet) {
    Create a node for S with S0 as its parent at iteration 0
    With the following arrival time:
    't <== td + walking time from S0 to S'
    'Q (s, )) .offer(Node (t, 0, S))) ';
    We know we have to mark all the stops
    but we need to update 'destinationArrivalTimes';
    'continueMarkingStops (S, t, Sd)'
    mark stop S';
}
```

In more detail, a base case involves a situation where no hops are utilized and the commuter 102 only utilizes a walking option. The service provider can select stops within walking distance and mark them for use. The commuter 102 could identify a preferred walking distance, such as one or two blocks. Other preferred walking distances can also be used. The process may initiate with the determination of stops within walking distance because the commuter 102 may not initially be in a location of a stop. That is, the commuter 102 may have to walk to an initial stop, which could include a route-based or non-route-based stop.

In one example, one initial or marked stop may correspond to one of the bus stops 130A. Another initial stop could correspond to a non-route-based transit option such as a pickup location 134 for a bicycle. A third initial or marked stop may correspond to another non-route-based transit option such as a pickup location 132A for a scooter. As noted above, these initial stops may comprise dynamically moving or statically positioned stops. For example, the pickup location 132A for the scooter could be based on a prior user leaving the scooter at the pickup location 132A. Again, the service provider 108 can determine these locations from the point-to-point transit service systems 136 in real-time or near-real time.

As noted above, the service provider 108 can perform an iterative process of evaluating stops, which include the initial stops identified that were in walking distance for the commuter 102. During the iterative process, the service provider 108 can pre-process route-based stops by creating a collection of routes and stops based on the latest marked stops (e.g., stops identified/marked in a most recent iteration of the algorithm). In the examples provided above, the service provider 108 would process the routes and stops of the buses and trains, which are each route-based transit options.

A collection these routes and stops can be represented as a map M of route r to stops S which can be represented as M(r)=S. The service provider 108 can search and store routes that traverse through the marked stops. Referring again to the example above, one walking distance stop may correspond to one of the bus stops 130A, while another walking distance stop may correspond to the scooter pickup location 132A. Another walking distance stop may correspond to another non-route-based transit option such as a pickup location 134 for a bicycle. The service provider 108 may determine a route that traverses through multiple marked stops. In these instances, the service provider 108 may select one of these marked stops that are closer in proximity to a route head. For example, if bus stop 130B also corresponded to one of the initial marked stops (found within walking distance of the origin location 112), the service provider 108 may select the bus stop 130A as it is closer to a route head. As mentioned above, the service provider 108 can not only consider route-based transit options but also consider point-to-point (P2P), non-route-based transit options such as bike share. Again, a bike share stop (or station) does not have any route. Therefore, the initial determination of route-based transit stops/options are considered, while an analysis of P2P transit options may be determined at a later time in the iterative analysis. Logic for determining the map M of routes and stops relative to the marked stops includes:

```
while (Stop S left in marked set) :
    if (S is a P2P stop/station) :
        continue
    while (Route r left in routes set of stop S) :
        if (Stop S is before currently mapped stop M ®) :
            M (r) < == s;
    unmark Stop S;
```

Once the routes and stops relative to the marked stops have been determined by the service provider 108, any remaining marked stops are assumed to be P2P public transits like bicycle share or scooter service. The service provider 108 can then evaluate these remaining marked stops by determining next possible/future stops that the commuter 102 could travel to from these stops. The service provider 108 can determine if any of these possible stop options are valid. If the possible stop options are valid, the service provider 108 can create a path node for them. The service provider 108 can perform a validation check for route-based stops as well. Methods for validating potential or possible stop options may involve the determination of arrival times. These methods that relate to calculating alternative arrival times for possible stop options are disclosed infra. Generally, if the use of a possible stop option is invalid the service provider 108 can return infinity as arrival time to make ensure that the possible stop option is not marked for a next iteration. An example node creation logic can include:

```
while ( Stop S left in marked set) {
    unmark stop S
    ridingSet <= stops in riding distance of S;
    while (Stop Sr left in ridingSet) {
        ridingTime <= riding time from Stop S to Sr
        Calculate arrival time from stop S to stop Sr at iteration k
        and create Nodes accordingly.
        'arrivalTime <= calculateArrivalTime (S, Sr, k, ridingTime,
        riding P2P)';
        Should we mark Sr for next iteration?;
        if ('continueMarkingStops (Sr, arrivalTime, Sd) ') {
            mark Sr for next iteration
        }
    }
}
```

The service provider 108 can evaluate the stops and routes in the map M beginning with the stop S in the route r in the map M and process all the stops on this route after the stop S (including S). The service provider 108 is configured not to assume a specific trip or path initially. The service provider 108 can select a path that leaves an initial stop right after its best arrival time in the previous iteration (Q(S, k−1).peekBottom( ).arrivalTime). When a stop S is selected, the service provider 108 can evaluate a previous iteration and determine what the best arrival time was. As mentioned, FLPQ (Q) keeps N solution. So in a previous iteration, the service provider 108 may determine N arrival times. To be sure, the service provider considered the best arrival time in previous iteration and considers it the start time for current iteration.

The service provider 108 can continue processing arrival times of each stop thereafter, which could include all the stops after stop S in route R. During this process, the service provided 108 can determine a possible/potential stop that the commuter 102 could pick-up from possible/potential stops identified in the map M. Stated otherwise, the service provider 108 creates a node for a path that has a beginning of a pick-up stop. It will be understood that the commuter 102 can exit in any of the stops after the pick-up stop. In some embodiments, the service provider 108 can evaluate each possible/potential stop. The service provider 108 can identify any of the possible/potential stops as a potential stop for a next iteration, which effectively indicates that the path could be continued from the potential stop. Example logic for processing stops and routes in the map M includes:

```
while (Route r and stop S left in M) {
    No trip is selected and
    no pick up stop is selected.
    't = null'
    'Sp = null'';
    while (Stop Sr left in the stops set of Route r beginning with S) {
        if (a trip is selected) {
            Calculate arrival time from stop Sp to stop Sr with trip t
    at iteration k and create Nodes accordingly.
    'arrivalTime <= calculateArrivalTime )Sp, Sr, k, t(Sr),
    ridingRouteBased)';
    Should we mark Sr for next iteration?;
            if ('continueMarkingStops (Sr, arrivalTime, Sd)') {
                mark Sr for next iteration
            }
    }
    find the best arrival time to Sr in previous iteration.
    'bestLastTime <= Q (s, − 1) .peekBottom( ) .arrivalTime';
    if (No trip selected or
        departure time of current trip from stop Sr is after bestLastTime) {
            We need to select a new Trip.
            t = first possible trip leaving Sr after bestLastTime;
            Set sr as ;pick up stop of this trip.
            'Sp <- Sr';
        }
        if (still no trip is selected)
            break;
    }
}
```

After marked stop have been processed by the service provider 108 and one hop (e.g., k+1) is added, the service provider 108 can process possible walking options from these newly marked stops to other potential stops walking distance of the commuter 102 and if a walking arrival time is better than the arrival times of trips/paths previously found for destination location 114 the service provider 108 can mark these new potential stops for next iteration as well. Logic for assessing walking options after possible stops in a current iteration includes:

```
while( Stop S left in next iteration marked set) {
    walkingSet <= stops in walking distance of S;
    while (Stop Sr left in walkingSet) {
        walkingTime <= walking time from Stop S to Sr
        Calculate arrival time from stop S to stop Sr at iteration k
        and create Nodes accordingly.
        'arrivalTime <= calculateArrivalTime (S, Sr, k, walkingTime,
        walking)';
        Should we mark Sr for next iteration?;
        if ('continueMarkingStops (Sr, arrivalTime, Sd) ') {
            mark Sr for next iteration
        }
    }
}
```

According to some embodiments, the service provider 108 can determine if there is a stop that has been marked for the next iteration. If no stops have been marked, the service provider 108 terminates the main stop searching process discussed above. The service provider 108 may then find the best N solutions for the destination location 114. The service provider 108 can evaluate the solutions found for destination location in the iterations and retain the N best solutions. The service provider 108 can evaluate the solutions using a FLPQ and storing the solutions that were found for the destination stop Sd (e.g., destination location). Example logic for determining solutions using a FLPQ include:

```
Create FLPQ solutions with capacity N;
for (k = 0; k < K; k++) {
    while (Node solution left in Q(Sd), k)) {
        'solutions.offer (solution)' ;
    }
}
```

As noted above, the service provider 108 can be configured to calculate arrival times using a calculateArrivalTime method. Within this context, additional details regarding the creation of nodes are provided. To create a node (or determine when a node should not be created), the service provider 108 can determine how the commuter 102 arrived to a parent stop. As mentioned above, the service provider 108 can store a solution as parent pointing solutions (i.e., for each S we know the arrival time to that stop, the number of hops to arrive to that stop, as well as the parent stop). The parent stop means the stop where a commuter changed their transportation service and hopped on a bus. Beside the origin stop, where a commuter initiates their trip, the stops may have a parent stop which identifies the stop used to arrive at another subsequent stop.

For example, if the commuter 102 walked to a parent stop and the currently selected option is also for the commuter to continue walking, the service provider 108 does not create a node. If the commuter 102 rode a bicycle of a bicycle service to a parent stop and then subsequently rides the bicycle to a subsequent stop the service provider 108 may not add a new node. Assuming none of the above examples occur, the service provider 108 may create a node and attempt to add the node to a FLPQ by executing an offer process. An offer process is successful, if a new arrival time for the node is better than previous arrival times to a stop, the node may be retained and its arrival time may be selected.

If no successful offer is determined by the service provider 108, the service provider 108 can return infinity as arrival time (as noted above), meaning that the stop should not be utilized in the current iteration. This process allows the service provider 108 to ensure that a stop should not get marked for a next iteration because its arrival time did not improve. Example logic for calculating arrival times and creating a node for a path/trip can include:

```
'calculateArrivalTime (Stop 51, Stop S2, iterationnumber k, time, mode)
';
arrivalTime <= infinity;
changed <= false;
if (mode == walking) {
    while (Path node is left in Q(S1, k)) {
        if (mode to node is walk) {
            we can not have 2 consequitive walk'
            continue;
        }
        arrivalTime = time + node.arrivalTime;
        Does adding new arrival time to FLPQ cause any change in it?;
        if (Q (S2, k) .offer (Node(arrivalTime, k, S1)) {
            changed < = true;
        }
    }
}
if (mode == ridingP2P) {
    while (Path node is left in Q(S1, k - 1)) {
        if (mode to node is riding with the same PTO) {
            we can not have 2 consequitive riding of same PTO;
            continue;
        }
        arrivalTime = time + ode.arrivalTime;
        Does adding new arrival time to FLPQ cause any change in it?;
        if (Q(S2, k) .offer(Node (arrivalTime, k, S1)) {
            changed < = true;
        }
    }
}
If (mode == ridingRouteBased) {
    arrivalTime = time;
    Does adding new arrival time to FLPQ cause any change in it?;
    If (Q(S2, k) .offer (Node (arrivalTime, k, S1)) {
        Changed <= true;
    }
}
if (changed) ( {
    return return arrivalTime
}else{
    return return infinity;
}
```

In general, the service provider 108 can provide the commuter 102 with a list of solutions for a multi-modal journey. This list could be provided to the mobile device 106 of the commuter. For example, a first path 138A could include the commuter 102 sequentially using stops 130A, 134, and 132B to arrive at the destination location 114 at 2:10 pm ($T_D$), while a second path 138B could include the commuter 102 sequentially using stops 132A and 130C, with the commuter finally walking from another bus station 130D to arrive at the destination location 114 at 2:00 pm ($T_D$).

Figure 2:
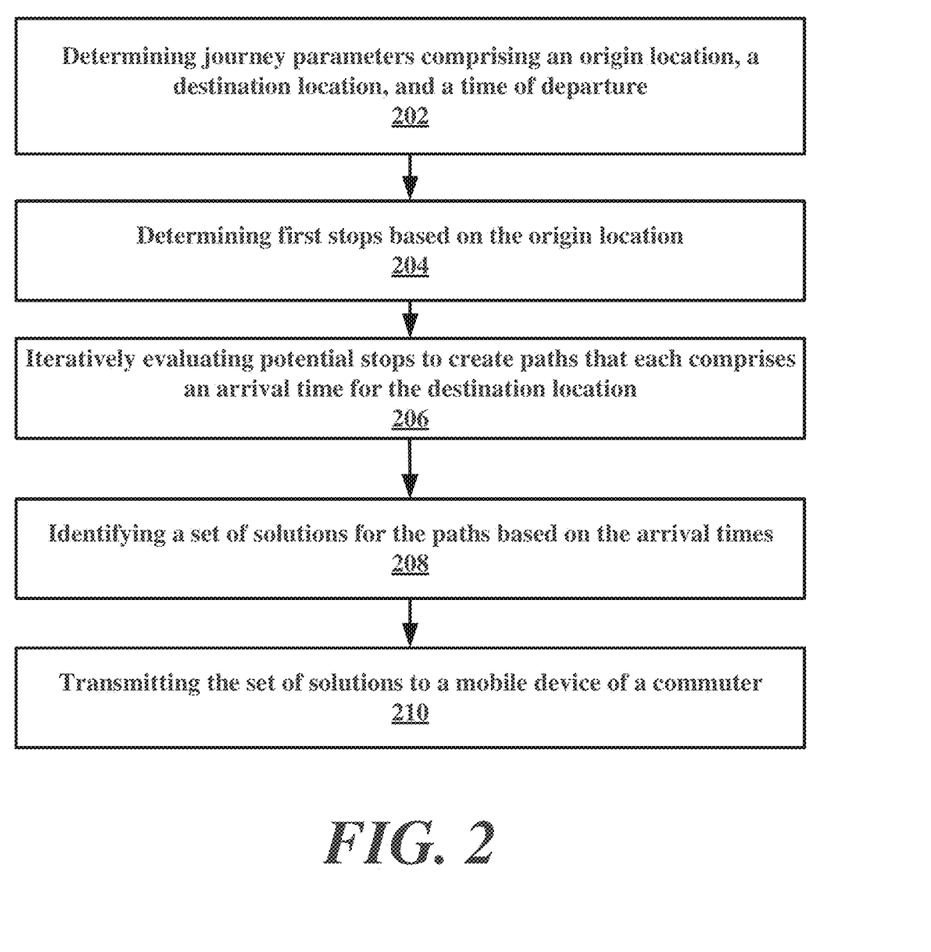
FIG. 2 is a flowchart of an example method of the present disclosure.

FIG. 2 is a flowchart of an example method of the present disclosure. The method generally includes a step 202 of determining journey parameters comprising an origin location, a destination location, and a time of departure. For example, the origin location and time of departure can comprise a current location of a commuter that is determined from a location of a mobile device of the commuter. Once these initial conditions have been determined, the method can include a step 204 of determining first stops based on the origin location. The first stops can be within walking distance of the origin location. Again, the walking distance can be selected by the commuter.

Once these initial stops are identified, the method can include a step 206 of determining potential stops to create paths. To be sure a first path of the paths comprises a marked stop of the marked stops and a portion of the potential stops.

The first path connects the marked stop to the destination location. The first path may have an arrival time relative to the destination location. The marked stops and the potential stops may comprise a route-based option and a non-route-based option. Step 206 can include the iterative node/FLPQ process disclosed above. Step 206 can include creating additional paths other than the first. In some instances, a path is created for each of the marked stops. Thus, if there are four marked stops, four paths may be created.

Once the iterative analysis is complete, the method can include a step 208 of identifying a set of solutions for the paths based on the arrival times, as well as step 210 of transmitting the set of solutions to a mobile device of a commuter.

Again, the stops referenced in this method can include route-based options and/or non-route-based options. The non-route-based options can comprise any of a bicycle service, a scooter service, or another on-demand, point-to-point transit service.

To be sure, the set of solutions includes a best-performing set of solutions. Rather than providing the commuter with a single best option, the provision of a set of solutions allows for the commuter to select one of these options based on commuter preference. For example, the commuter may decide to utilize a path that includes a scooter service, rather than a path that includes only bus or train service. In another example, the commuter may decide to utilize a path that includes a bicycle service, rather than a path that includes only a scooter service because the commuter does not prefer to ride a scooter, even when the path that includes the bicycle service is determined to have a longer arrival time to the destination location than an arrival time of a path that includes the bicycle service.

Figure 3:
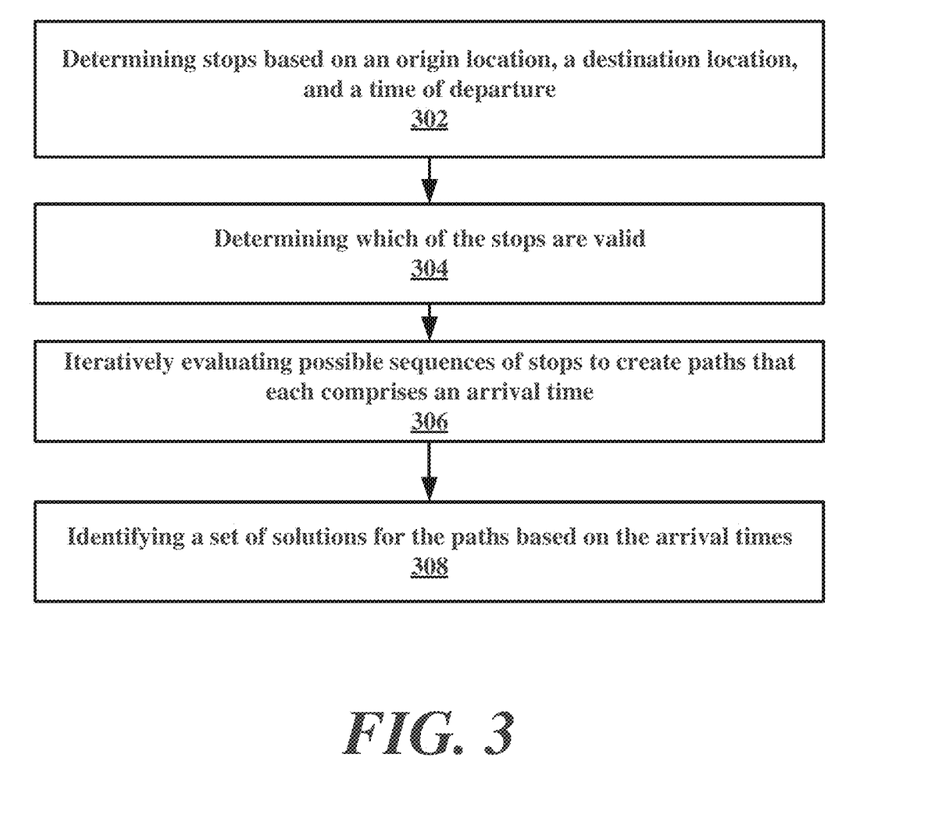
FIG. 3 is a flowchart of another example method of the present disclosure.

FIG. 3 is a flowchart of another example method of the present disclosure. The method includes a step 302 of determining stops based on an origin location, a destination location, and a time of departure. As noted above, the stops can include route-based options, non-route-based transit options, and walking options. In various embodiments, the method includes a step 304 of determining which of the stops are valid. In some embodiments, this can include determining if an arrival time of a stop causes the commuter to arrive at a stop or destination location earlier than another option. Initially, the base use case is the user walking to the destination location. The analysis can iterate from this base use case. Thus, the method includes a step 306 of determining sequences of the valid stops that create paths that each comprise an arrival time. In one instance, a first path of the paths comprises a portion of the valid stops. The valid stops comprise a route-based option and a non-route-based option, and the non-route-based transits option include at least one of a bicycle service, a scooter service, or another on-demand, or a point-to-point transit service that does not operate according to a schedule.

The method can also include a step 308 of identifying a set of solutions for the paths based on the arrival times. This includes analyzing solutions for the first path specified in step 306.

Figure 4:
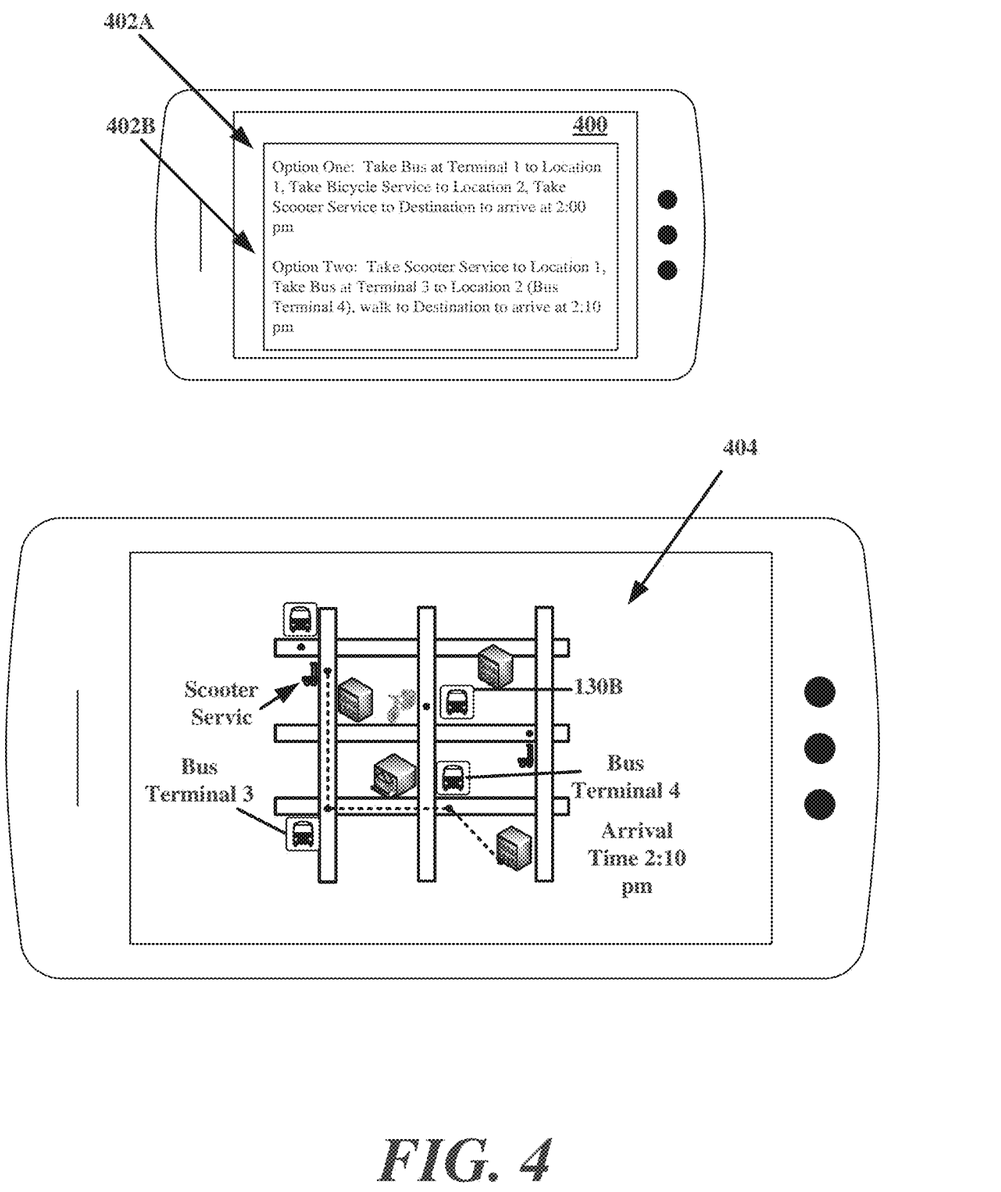
FIG. 4 is a schematic view of an example graphical user interface that is provided on a mobile device that displays a list of multi-modal journey options or paths, and a map-based representation of a selected multi-modal journey path.

FIG. 4 illustrates a graphical user interface (GUI 400) that can display a plurality of N best solutions for a multi-modal journey. The GUI 400 includes a list of options having entries 402A-402C that each corresponds to one of the N best solutions. In general, the entry could specify the transit options used and an arrival time. FIG. 4 also illustrates an example map 404 that corresponds to the selected entry 402B. In various embodiments, when the commuter selects a solution that includes a P2P or non-route-based transit option, the commuter can be provided with an option to reserve the P2P or non-route-based transit option from their mobile device. A use case is presented with reference to FIGS. 1 and 4. If the solution includes a P2P or non-route-based transit option of using a scooter service, the commuter 102 can request a reservation (through their mobile device 106) of a scooter device at or near a time that the commuter 102 should arrive at a scooter service stop as determined by the service provider 108. The service provider 108 can request the reservation through the point-to-point transit service systems 136.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
   determining stops based on an origin location, a destination location, and a time of departure, the stops including route-based transit options, non-route-based transit options, and walking options;
   determining which of the stops are valid;
   determining sequences of the valid stops that create paths that each comprise an arrival time, a first path of the paths comprising a portion of the valid stops, wherein the valid stops comprise the route-based transit options and the non-route-based transit options, wherein the non-route-based transit options include at least one of a bicycle service, a scooter service, or another on-demand or a point-to-point transit service that does not operate according to a schedule, wherein determining sequences of the valid stops comprises iteratively evaluating possible sequences of stops by incrementally adding a stop at each iteration when a transit option has been used;
   identifying a set of solutions for the paths, including the first path, based on the arrival times;
   selecting a walking option when the walking option has an arrival time to the destination location that is earlier than an arrival time at the destination for the route-based transit options or the non-route-based transit options;
   selecting one of the valid stops based on an earliest stop arrival time or a lowest number of stops, wherein selecting one of the valid stops further comprises:
      generating a first fixed-length priority queue for each of the valid stops of one of the paths, and iterating through the first fixed-length priority queues by increasing a number of valid stops until a set of solutions are determined, wherein when the stop arrival time is updated, the method further comprises:

comparing the arrival time for the destination location to the stop arrival time; and determining when the valid stop is marked for review in a subsequent iteration wherein determining when the valid stop is marked for review in the subsequent iteration comprises establishing a second fixed-length priority queue for the destination location that comprises a portion of the paths, further wherein when the second fixed-length priority queue is not full, the valid stop that is currently being evaluated is marked for review in the subsequent iteration.

2. The method according to claim 1, wherein the non-route-based transit option does not include walking.

3. The method according to claim 1, wherein when a new arrival time of the valid stop that is currently being evaluated occurs before a latest arrival time to the destination location, the valid stop that is currently being evaluated is marked for review in a subsequent iteration.

4. A transit-routing expediter system, comprising:
a processor; and
a memory for storing instructions, the processor executing the instructions to:
receive an origin location, a destination location, and a time of departure;
determine marked stops within walking distance of the origin location;
determine additional stops selected from a route-based transit option, a non-route-based transit option, and a walking option relative to the marked stops and the destination location to create paths, wherein a first path of the paths comprising a marked stop of the marked stops and a portion of the potential stops, the first path connecting the marked stop to the destination location
determine arrival times for the paths, including the first path; and
transmit the paths to a mobile device of a commuter,
wherein the processor is configured to determine additional stops through an iterative process comprising:
selecting one of the additional stops based on an earliest stop arrival time or a lowest number of stops;
generating a first fixed-length priority queue for each of the additional stops selected;
iterating through the first additional stops until a set of solutions are determined,
wherein when the stop arrival time is updated:
comparing the arrival time for the destination location to the stop arrival time; and
determining when one of the additional stops is marked for review in a subsequent iteration by establishing a second fixed-length priority queue for the destination location that comprises a portion of the paths, further wherein when the second fixed-length priority queue is not full, a current stop is marked for review in the subsequent iteration, wherein when a new arrival time of the current stop occurs before a latest arrival time to the destination location, the current stop is marked for review in a subsequent iteration.

5. The transit-routing expediter system according to claim 4, wherein the processor is configured to select the walking option when the walking option has an arrival time to the destination location that is earlier than an arrival time at the destination for the route-based transit option or the non-route-based transit option.

* * * * *